(12) United States Patent
Masuda

(10) Patent No.: US 10,328,809 B2
(45) Date of Patent: Jun. 25, 2019

(54) CHARGING APPARATUS AND CONTROL METHOD FOR CHARGING APPARATUS

(71) Applicant: Toyota Jidosha Kabushiki Kaisha, Toyota-shi, Aichi-ken (JP)

(72) Inventor: Tomokazu Masuda, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 33 days.

(21) Appl. No.: 15/687,809

(22) Filed: Aug. 28, 2017

(65) Prior Publication Data

US 2018/0065495 A1 Mar. 8, 2018

(30) Foreign Application Priority Data

Sep. 5, 2016 (JP) ................. 2016-172634

(51) Int. Cl.

| | |
|---|---|
| *H02J 7/00* | (2006.01) |
| *B60L 11/18* | (2006.01) |
| *H01R 13/621* | (2006.01) |
| *H01R 13/639* | (2006.01) |
| *H01R 13/641* | (2006.01) |
| *H01R 13/66* | (2006.01) |
| *B60L 53/16* | (2019.01) |
| *B60K 6/22* | (2007.10) |
| *H01R 24/20* | (2011.01) |
| *H01R 24/66* | (2011.01) |

(52) U.S. Cl.
CPC .......... *B60L 11/1818* (2013.01); *B60L 53/16* (2019.02); *H01R 13/621* (2013.01); *H01R 13/639* (2013.01); *H01R 13/641* (2013.01); *H01R 13/6683* (2013.01); *B60K 6/22* (2013.01); *B60Y 2200/91* (2013.01); *B60Y 2200/92* (2013.01); *B60Y 2300/91* (2013.01); *H01R 24/20* (2013.01); *H01R 24/66* (2013.01); *H01R 2201/26* (2013.01); *Y10S 903/904* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

2012/0238122 A1* 9/2012 Hirashita ............ B60L 11/1818
439/304
2016/0368391 A1 12/2016 Kojima

FOREIGN PATENT DOCUMENTS

| JP | 2013176274 A | 9/2013 |
| JP | 2014140279 A | 7/2014 |
| JP | 2015-023748 A | 2/2015 |
| JP | 2015195660 A | 11/2015 |

(Continued)

*Primary Examiner* — Arun C Williams
(74) *Attorney, Agent, or Firm* — Dinsmore & Shohl LLP

(57) ABSTRACT

An inlet is configured to connect with a connector of a charging cable. An ECU is configured to switch between (i) a charging permitted state in which external charging is permitted and (ii) a charging non-permitted state in which external charging is not permitted. When the connector is in connection to the inlet, the ECU selects the charging permitted state in which external charging is permitted, even if a connector connection signal indicative of a state of connection between the connector and the inlet indicates a partially-connected state in which the connection between the connector and the inlet is not latched.

6 Claims, 11 Drawing Sheets

(56) References Cited

FOREIGN PATENT DOCUMENTS

WO 2013128298 A2 9/2013

* cited by examiner

CHARGING APPARATUS AND CONTROL METHOD FOR CHARGING APPARATUS

CROSS-REFERENCE TO RELATED APPLICATIONS

This application claims priority to Japanese Patent Application No. 2016-172634 filed on Sep. 5, 2016, the entire contents of which are hereby incorporated by reference.

BACKGROUND

Field

The present disclosure relates to a charging apparatus and a control method therefor, and particularly to a charging apparatus for charging a vehicle-mounted power storage device with electric power supplied from an electric power source external to a vehicle through a charging cable, and a control method for the charging apparatus.

Description of the Background Art

Japanese Patent Laying-Open No. 2015-23748 discloses a charging apparatus configured to charge a vehicle-mounted power storage device with electric power supplied from an electric power source external to a vehicle through a charging cable (hereinafter, the electric power source external to the vehicle will also be referred to as "external power source" and charging of the power storage device by the external power source will also be referred to as "external charging").

This charging apparatus is provided with a locking device (locking mechanism) for locking connection between a connector of the charging cable and an inlet of the vehicle so as to prevent the connector connected to the inlet from being inadvertently removed from the inlet. The connector is provided with a latching mechanism (link) for latching the connector and the inlet, and a push button for releasing the latching by the latching mechanism. The locking device does not permit the operation of the push button and thereby locks the connection between the connector and the inlet. When the push button is operated with the locking device being in an unlocked state, the latching between the connector and the inlet by the latching mechanism is released and the connector can be removed from the inlet (refer to Japanese Patent Laying-Open No. 2015-23748).

When the push button of the connector is operated with the connector being in connection to the inlet, a state of connection between the connector and the inlet is recognized as a partially-connected state in which the connection between the connector and the inlet is not latched. When the push button of the connector is operated, the state of connection between the connector and the inlet is recognized as the partially-connected state, and consequently external charging is stopped, although removal of the connector from the inlet is not intended, various problems described below may arise.

Specifically, for example, external charging may remain stopped when the user is away from the vehicle, or in a public charging apparatus that requires authentication on a per-charging basis, the authentication operation for restarting external charging may be required again, or the fee payment operation may be performed again in the case of a system that collects a fee on a per-charging basis.

SUMMARY

The present disclosure has been made to solve the above-described problems, and an object of the present disclosure is to provide a charging apparatus and a control method therefor in which unnecessary stop of external charging caused by the operation of the connector during external charging can be suppressed.

A charging apparatus of the present disclosure is a charging apparatus for charging a vehicle-mounted power storage device with electric power supplied from an external power source through a charging cable, the charging apparatus including: an inlet; and a control device. The inlet is configured to connect with a connector of the charging cable. The control device is configured to switch between (i) a first state (charging permitted state) in which charging of the power storage device is permitted and (ii) a second state (charging non-permitted state) in which charging of the power storage device is not permitted. When the connector is in connection to the inlet, the control device is configured to select the first state even if a connection signal (connector connection signal PISW) indicative of a state of connection between the connector and the inlet indicates a partially-connected state in which the connection between the connector and the inlet is not latched.

In this charging apparatus, when the connector is in connection to the inlet, the state of permitting external charging is continued even if a push button of the connector is operated by mistake, for example, and it is determined that the state of connection between the connector and the inlet is in the partially-connected state. Therefore, according to this charging apparatus, unnecessary stop of external charging caused by the operation of the connector can be suppressed.

The charging apparatus further includes a locking device. The locking device is configured to switch between (i) a locked state in which the connector connected to the inlet cannot be removed from the inlet and (ii) an unlocked state in which the connector connected to the inlet can be removed from the inlet. When the connection signal indicates the partially-connected state and when the locking device is in the locked state, the control device is configured to select the first state. On the other hand, when the connection signal indicates the partially-connected state and when the locking device is in the unlocked state, the control device is configured to select the second state even if the connector is in connection to the inlet.

In this charging apparatus, when the connection signal indicates the partially-connected state and when the locking device is in the unlocked state, external charging is not permitted even if the connector is in connection to the inlet, because the connector may be removed. On the other hand, when the locking device is in the locked state even if the connection signal indicates the partially-connected state, it is determined that the connector is in firm connection to the inlet and external charging is permitted. As a result, when the locking device is in the locked state, the state of permitting external charging is continued even if a third party tries to remove the connector by mistake (or intentionally), for example. Therefore, according to this charging apparatus, unnecessary stop of external charging caused by the operation of the connector can be suppressed.

When the connection signal indicates the partially-connected state and when the locking device is in the locked state, the control device is configured to select the first state and reduce a current received from the external power source through the charging cable.

As a result, even if the connector is removed from the inlet, removal of the connector from the inlet with a large current flowing can be prevented.

When the connection signal indicates a state (connection-latched state) in which the connection between the connector and the inlet is latched, while the control device is reducing the current received from the external power source through the charging cable, then the control device is configured to end the reduction of the current.

As a result, external charging can be restarted without performing the authentication operation and the like for restarting external charging (ending the reduction of the current).

During the first state (charging permitted state), the charging apparatus is actuated with electric power supplied from a power storage device for auxiliary machinery. The power storage device for auxiliary machinery is charged with a part of the electric power supplied from the external power source through the charging cable. When a situation in which the connection signal indicates the partially-connected state and the locking device is in the locked state continues for a predetermined time period, the control device is configured to switch from the first state to the second state (charging non-permitted state).

During the first state, the power storage device for auxiliary machinery is charged with the part of the electric power supplied from the external power source through the charging cable. Therefore, if the reduced state of the current received from the external power source through the charging cable continues for a long time, the power storage device for auxiliary machinery may be exhausted. According to the above-described configuration, when the situation in which the connection signal indicates the partially-connected state and the locking device is in the locked state continues for the predetermined time period, switching from the first state to the second state is performed. Therefore, exhaustion of the power storage device for auxiliary machinery caused by the reduction of the current received from the external power source through the charging cable can be avoided.

A control method of the present disclosure is a control method for a charging apparatus for charging a vehicle-mounted power storage device with electric power supplied from an external power source through a charging cable. The charging apparatus includes: an inlet; and a locking device. The inlet is configured to connect with a connector of the charging cable. The locking device is configured to switch between a locked state and an unlocked state. The control method includes: determining a state of connection between the connector and the inlet; determining whether the locking device is in the locked state or in the unlocked state; not permitting charging of the power storage device when it is determined that the state of connection is in a partially-connected state and when it is determined that the locking device is in the unlocked state; and permitting charging of the power storage device when it is determined that the state of connection is in the partially-connected state and when it is determined that the locking device is in the locked state.

In this control method, when it is determined that the state of connection between the connector and the inlet is in the partially-connected state and when the locking device is in the unlocked state, external charging is not permitted. On the other hand, when the locking device is in the locked state even if it is determined that the state of connection is in the partially-connected state, it is determined that the connector is in film connection to the inlet and external charging is permitted. As a result, when the locking device is in the locked state, the state of permitting external charging is continued even if a third party tries to remove the connector by mistake (or intentionally), for example. Therefore, according to this control method, unnecessary stop of external charging caused by the operation of the connector can be suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a time chart showing changes in a pilot signal, a connector connection signal, a signal S2 and the like.

DESCRIPTION OF THE PREFERRED EMBODIMENTS

Figure 1:
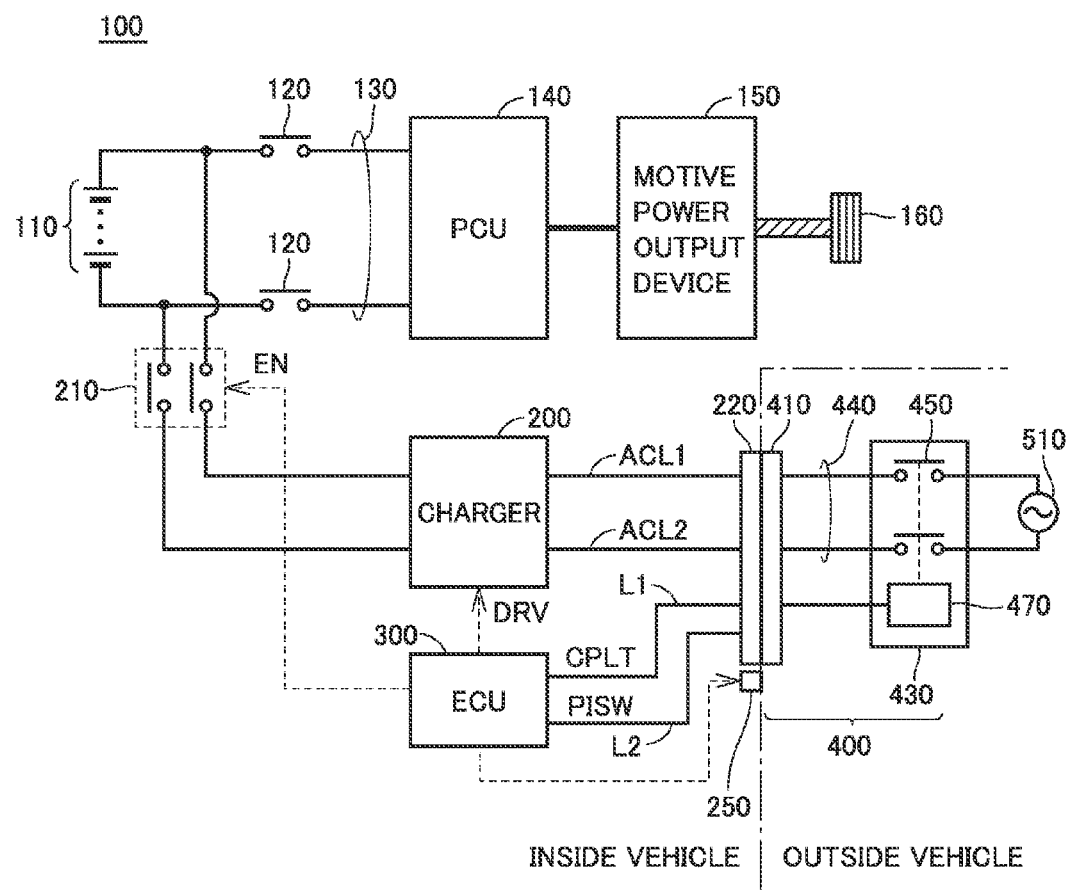
FIG. 1 is an overall block diagram of a vehicle to which a charging apparatus according to an embodiment is applied.

An embodiment of the present disclosure will be described in detail hereinafter with reference to the drawings, in which the same or corresponding portions are denoted by the same reference characters and description thereof will not be repeated.

FIG. 1 is an overall block diagram of a vehicle to which a charging apparatus according to an embodiment of the present disclosure is applied. Referring to FIG. 1, a vehicle 100 includes a power storage device 110, a system main relay (hereinafter also referred to as "SMR") 120, a power control unit (hereinafter also referred to as "PCU") 140, a motive power output device 150, and a driving wheel 160. Vehicle 100 further includes a charging relay 210, a charger 200, an inlet 220, a locking device 250, and an electronic control unit (hereinafter also referred to as "ECU") 300.

Outside vehicle 100, an external power source 510 and a charging cable 400 connected to external power source 510 are provided. Charging cable 400 includes a connector 410, a power line pair 440 and an EVSE (Electric Vehicle Supply Equipment) 430. EVSE 430 includes a CCID (Charging Circuit Interrupt Device) 450 and a CPLT control circuit 470.

Power storage device 110 is a rechargeable DC power source and is configured to include a secondary battery such as, for example, a lithium ion battery and a nickel-metal hydride battery. Power storage device 110 is charged with electric power generated at motive power output device 150, and in addition, is charged with electric power supplied from external power source 510 during external charging. An electric double layer capacitor and the like can also be used as power storage device 110. SMR 120 is a relay provided between power storage device 110 and a power line pair 130 connected to PCU 140, for electrically connecting/disconnecting power storage device 110 and power line pair 130.

PCU 140 collectively represents a power conversion device for driving motive power output device 150 with the electric power supplied from power storage device 110. For example, PCU 140 is configured to include an inverter for driving a motor included in motive power output device 150, a converter for boosting a DC voltage supplied to the inverter to a voltage equal to or higher than a voltage of power storage device 110, and the like. Motive power output device 150 collectively represents a device that outputs the motive power for driving driving wheel 160. For example, motive power output device 150 is configured to include a motor for driving driving wheel 160, an engine and the like.

External power source 510 is, for example, a commercial system power source. EVSE 430 is provided in charging cable 400 and controls supply and interruption of the electric power from external power source 510 to vehicle 100 through charging cable 400. Although EVSE 430 is provided in charging cable 400 in the present embodiment, EVSE 430 may be provided in a charging stand for supplying electric power to vehicle 100 through the charging cable. CCID 450 is a relay provided in a power feeding path from external power source 510 to vehicle 100 and is controlled by CPLT control circuit 470.

CPLT control circuit 470 generates a pilot signal CPLT for exchanging predetermined information between EVSE 430 and vehicle 100 during external charging, and outputs pilot signal CPLT to vehicle 100 through a dedicated signal line included in charging cable 400. The potential of pilot signal CPLT is controlled in vehicle 100 and CPLT control circuit 470 controls CCID 450 based on the potential of pilot signal CPLT. That is to say, control of the potential of pilot signal CPLT in vehicle 100 allows remote control of CCID 450 from vehicle 100. This pilot signal CPLT complies with, for example, "SAE J1772 (SAE Electric Vehicle Conductive Charge Coupler)" in the United States.

Inlet 220 is configured to connect with connector 410 of charging cable 400. When external charging is executed, inlet 220 receives the electric power supplied from external power source 510 through connector 410, and outputs the received electric power to charger 200.

Signal lines L1 and L2 are provided between inlet 220 and ECU 300. Signal line L1 is a signal line for transmitting pilot signal CPLT described above. Signal line L2 is a signal line for transmitting a connector connection signal PISW indicative of a state of connection between inlet 220 and connector 410. Connector connection signal PISW is a signal whose potential changes in accordance with the state of connection between inlet 220 and connector 410. Connector connection signal PISW will be described in detail later.

Locking device 250 is configured to switch between a locked state in which connector 410 connected to inlet 220 cannot be removed from inlet 220 and an unlocked state in which connector 410 connected to inlet 220 can be removed from inlet 220. Locking device 250 is actuated in accordance with an instruction provided from ECU 300 and takes either the locked state or the unlocked state. Although ECU 300 can grasp the state of locking device 250 based on the aforementioned instruction, notification of the state of locking device 250 may be provided from locking device 250 to ECU 300. The configuration of locking device 250 will be described in detail later.

Charger 200 is electrically connected to power storage device 110 with charging relay 210 interposed therebetween. In accordance with an instruction provided from ECU 300, charger 200 converts the electric power supplied from external power source 510 to electric power having a charging voltage of power storage device 110. The electric power converted by charger 200 is supplied to power storage device 110 through charging relay 210, and power storage device 110 is charged with the electric power. Charging relay 210 is provided between charger 200 and power storage device 110, and electrically connects/disconnects charger 200 and power storage device 110 based on a signal EN provided from ECU 300.

ECU 300 includes a CPU (Central Processing Unit), an ROM (Read Only Memory) that stores a processing program and the like, an RAM (Random Access Memory) that temporarily stores data, an input/output port for inputting and outputting various types of signals, and the like (all are not shown). ECU 300 executes predetermined operation processing through software processing by executing a program stored in the ROM with the CPU and/or hardware processing by a dedicated electronic circuit.

Figure 2:
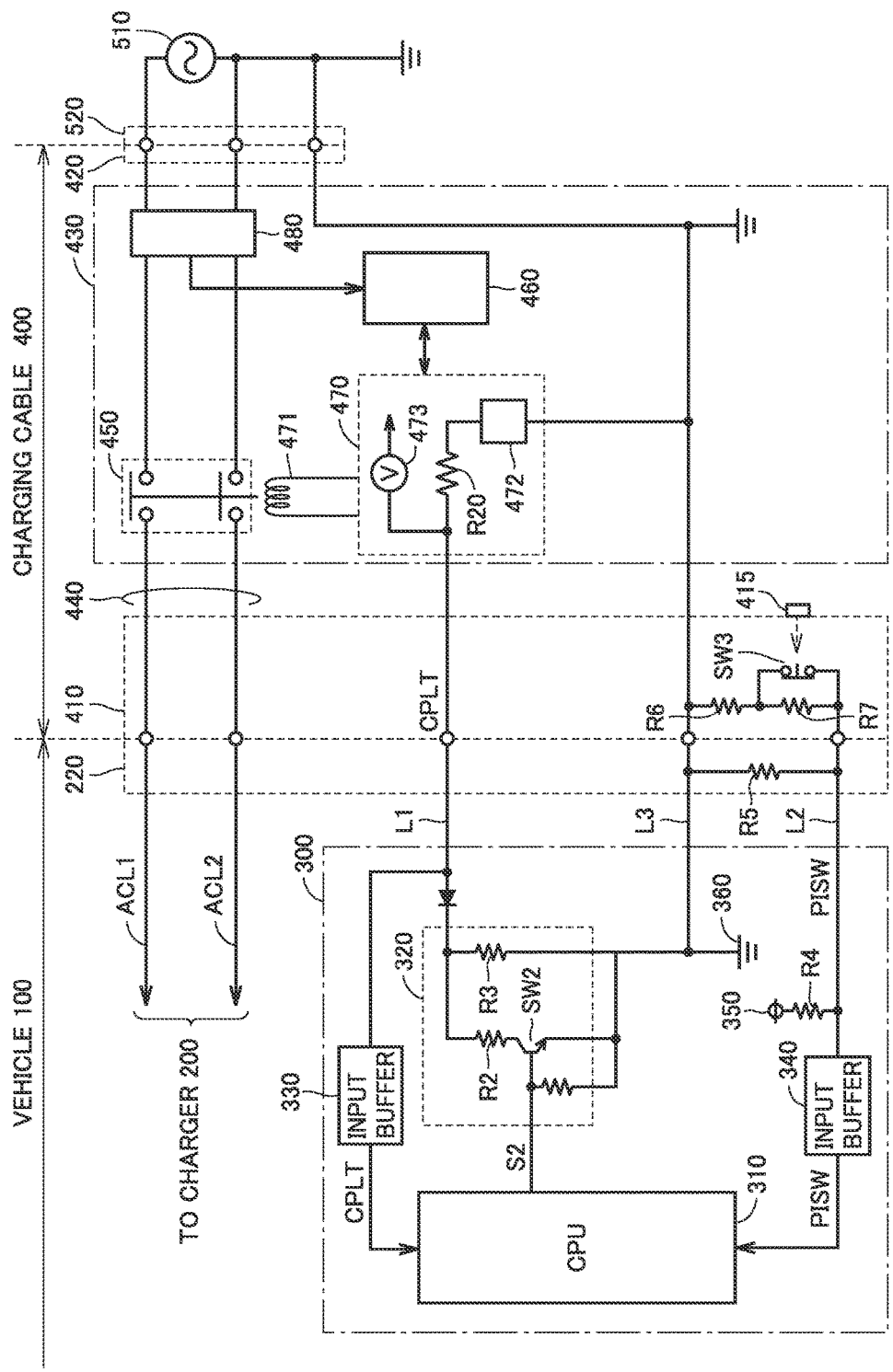
FIG. 2 is a diagram showing a circuit configuration of an ECU and an inlet of the vehicle as well as a charging cable.

FIG. 2 is a diagram showing a circuit configuration of ECU 300 and inlet 220 of vehicle 100 as well as charging cable 400. In this FIG. 2, the description of locking device 250 is omitted and the configuration of locking device 250 will be described with reference to FIGS. 3 to 6 described below. Referring to FIG. 2, charging cable 400 further includes a power source plug 420, and power source plug 420 is connected to an outlet 520 of external power source 510.

EVSE 430 provided in charging cable 400 includes CCID 450, a controller 460, CPLT control circuit 470, an electromagnetic coil 471, and a leakage detector 480. CPLT control circuit 470 includes an oscillation device 472, a resistance R20 and a voltage sensor 473.

CCID 450 (hereinafter also referred to as "CCID relay 450") is provided in power line pair 440 and is controlled by CPLT control circuit 470. When CCID relay 450 is open, an electric path is interrupted in charging cable 400. When CCID relay 450 is closed, supply of the electric power from external power source 510 to vehicle 100 through charging cable 400 becomes possible.

CPLT control circuit 470 outputs pilot signal CPLT to ECU 300 through connector 410 and inlet 220. As described above, the potential of pilot signal CPLT is controlled by ECU 300 and pilot signal CPLT is used as a signal for remotely controlling CCID relay 450 from ECU 300. CPLT control circuit 470 controls CCID relay 450 based on the potential of pilot signal CPLT. Pilot signal CPLT is also used as a signal for providing notification of a rated current of charging cable 400 from CPLT control circuit 470 to ECU 300.

Controller 460 includes a CPU, a storage device, an input/output port, and the like (all are not shown). Controller 460 inputs and outputs the signals of various sensors and CPLT control circuit 470, and also controls the operation of CPLT control circuit 470.

When the potential of pilot signal CPLT detected by voltage sensor 473 is a defined potential V0, oscillation device 472 outputs non-oscillating pilot signal CPLT. When the potential of pilot signal CPLT becomes a potential V1 (e.g., 9 V) lower than potential V0, oscillation device 472 outputs pilot signal CPLT oscillating at a defined frequency (e.g., 1 kHz) and duty cycle.

The duty cycle of pilot signal CPLT is set in accordance with the magnitude of the rated current that can be supplied from external power source 510 to vehicle 100 through charging cable 400. Based on the duty of pilot signal CPLT received from CPLT control circuit 470 through signal line L1, ECU 300 of vehicle 100 can sense the rated current that can be supplied to vehicle 100 through charging cable 400.

When the potential of pilot signal CPLT is further lowered to a potential V2 (e.g., 6 V) lower than potential V1, CPLT control circuit 470 supplies a current to electromagnetic coil 471. When the current is supplied from CPLT control circuit 470 to electromagnetic coil 471, electromagnetic coil 471 generates electromagnetic force and CCID relay 450 is closed.

Leakage detector 480 is provided in power line pair 440, and detects presence or absence of leakage in the electric path for supplying the electric power from external power source 510 to charger 200 of vehicle 100. Specifically, leakage detector 480 detects equilibrium of currents flowing through power line pair 440 in the directions opposite to each other, and senses occurrence of leakage when the equilibrium breaks. When leakage detector 480 detects leakage, power feeding to electromagnetic coil 471 is stopped and CCID relay 450 is opened.

Within connector 410, resistances R6 and R7 and a switch SW3 are provided. Together with a power source node 350 and a pull-up resistance R4 provided in ECU 300 of vehicle 100 as well as a resistance R5 provided in inlet 220, resistances R6 and R7 and switch SW3 form a circuit for sensing the state of connection between connector 410 and inlet 220.

Resistances R6 and R7 are serially connected between signal line L2 and a ground line L3. Switch SW3 is connected in parallel to resistance R7. Switch SW3 is a switch of a b contact point and operates in conjunction with a push button 415 (described below) of connector 410. Specifically, when push button 415 is not down, switch SW3 is in the closed state. When push button 415 is pushed, switch SW3 is opened. Resistance R5 is connected between signal line L2 and ground line L3 in inlet 220.

With such a circuit configuration, when connector 410 and inlet 220 are not connected to each other, a signal having a potential (V6) defined by a voltage of power source node 350, pull-up resistance R4 and resistance R5 is generated on signal line L2 as connector connection signal PISW. When connector 410 and inlet 220 are latched by a latching mechanism (described below) and completely connected to each other (hereinafter referred to as "connection-latched state"), a signal having a potential (V4) defined by a voltage of power source node 350, pull-up resistance R4 and resistances R5 and R6 is generated on signal line L2 as connector connection signal PISW. Furthermore, when the connection between connector 410 and inlet 220 is not latched by the latching mechanism (hereinafter referred to as "partially-connected state"), a signal having a potential (V5) defined by a voltage of power source node 350, pull-up resistance R4 and resistances R5 to R7 is generated on signal line L2 as connector connection signal PISW.

A relationship among the potentials of connector connection signal PISW generated in the above-described states (connection-latched state, partially-connected state, and unconnected) is V4 (connection-latched state)<V5 (partially-connected state)<V6 (unconnected). Therefore, by sensing the potential of connector connection signal PISW, ECU 300 can detect the state of connection (connection-latched state, partially-connected state, and unconnected) between connector 410 and inlet 220.

ECU 300 further includes a CPU 310, a resistance circuit 320, and input buffers 330 and 340, in addition to above-mentioned power source node 350 and pull-up resistance R4. Resistance circuit 320 includes pull-down resistances R2 and R3, and a switch SW2. Pull-down resistance R2 and switch SW2 are serially connected between a vehicle earth 360 and signal line L1 through which pilot signal CPLT is communicated. Pull-down resistance R3 is connected between vehicle earth 360 and signal line L1. In accordance with signal S2 provided from CPU 310, switch SW2 is turned on/off. This resistance circuit 320 is a circuit for controlling the potential of pilot signal CPLT communicated through signal line L1.

Specifically, when switch SW2 is turned off (brought into an interrupted state) with resistance circuit 320 being electrically connected to CPLT control circuit 470 through signal line L1, inlet 220 and connector 410, the potential of pilot signal CPLT becomes the potential (V1) defined by pull-down resistance R3. When switch SW2 is turned on (brought into a conducting state), the potential of pilot signal CPLT becomes the potential (V2) defined by pull-down resistances R2 and R3.

Input buffer 330 is a circuit for taking in pilot signal CPLT from signal line L1 to CPU 310. Input buffer 340 is a circuit for taking in connector connection signal PISW from signal line L2 to CPU 310.

CPU 310 receives pilot signal CPLT from input buffer 330, and receives connector connection signal PISW from input buffer 340. CPU 310 senses the potential of connector connection signal PISW, and determines the state of connection (connection-latched state, partially-connected state, and unconnected) between connector 410 and inlet 220 based on the potential of connector connection signal PISW. In addition, CPU 310 senses the oscillation state and the duty cycle of pilot signal CPLT and thereby detects the rated current of charging cable 400.

CPU 310 controls signal S2 (switch SW2) based on the state of connection between connector 410 and inlet 220 as well as the oscillation state of pilot signal CPLT, and thereby controls the potential of pilot signal CPLT. As a result, CPU 310 can switch between a state of permitting external charging (charging permitted state) by controlling CCID relay 450 to be in the closed state through remote control and a state of not permitting external charging (charging non-permitted state) by controlling CCID relay 450 to be in the open state.

The state of signal S2 can tell whether vehicle 100 is in the state of permitting external charging (charging permitted state) or in the state of not permitting external charging (charging non-permitted state). Specifically, when signal S2 is turned on by CPU 310, a contact point of CCID relay 450 in EVSE 430 is closed and the charging permitted state is obtained. On the other hand, when signal S2 is turned off by CPU 310, the contact point of CCID relay 450 in EVSE 430 is opened and the charging non-permitted state is obtained. Once transition is made from the charging permitted state to the charging non-permitted state, the user operation for restarting charging (such as, for example, the authentication operation for restarting external charging) is required again.

When signal S2 is turned on and CCID relay 450 in EVSE 430 is closed, an AC voltage from external power source 510 is provided to charger 200. After the completion of predetermined charging preparation process, CPU 310 outputs a control signal to charger 200. As a result, charger 200 is actuated and external charging by external power source 510 is executed.

Figure 3:
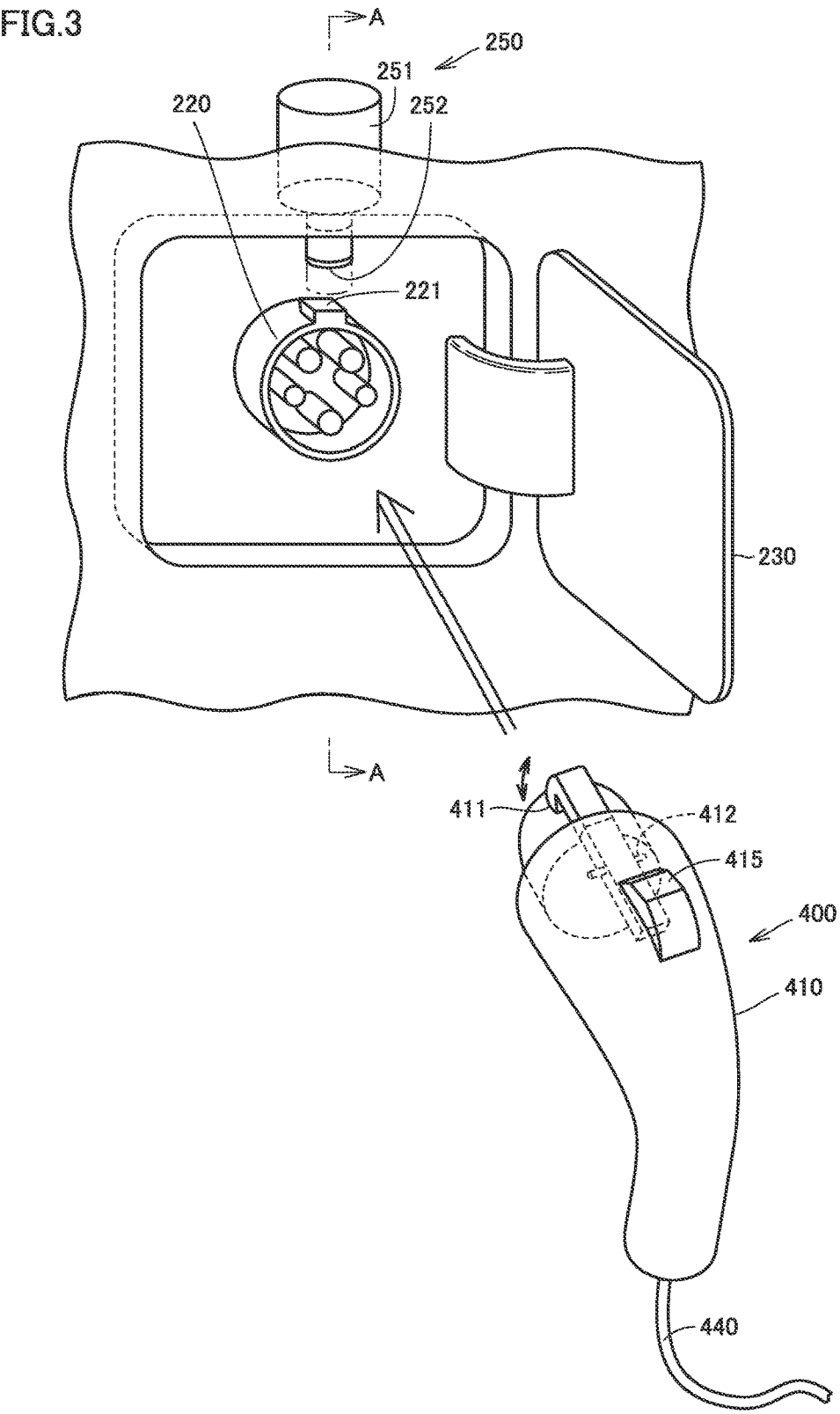
FIG. 3 is a diagram showing a structure around the inlet and a structure of a connector.
Figure 4:
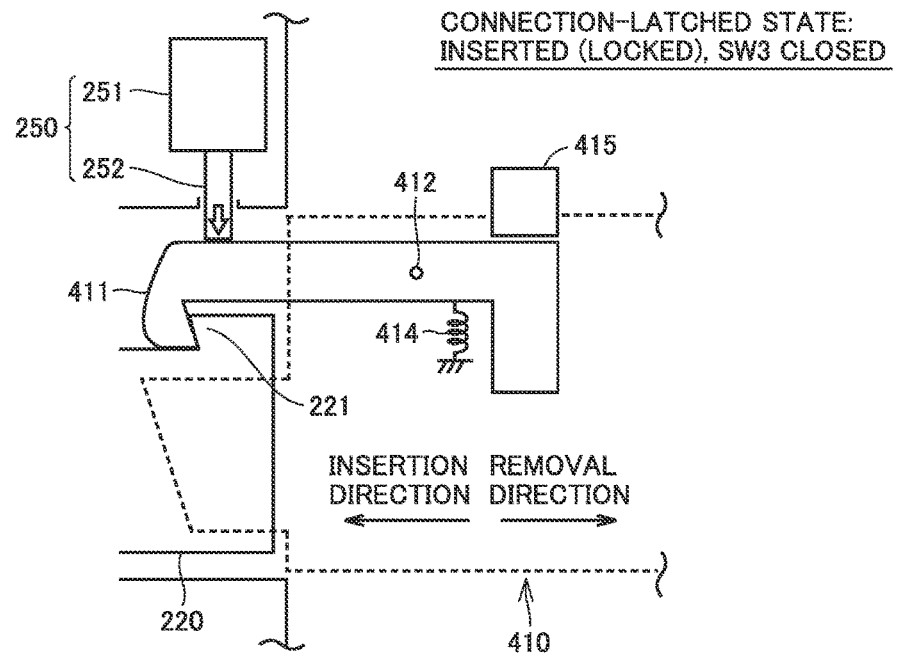
FIG. 4 is a cross-sectional view taken along line A-A in FIG. 3 and showing a case in which the connector is in complete connection to the inlet (connected state).
Figure 5:
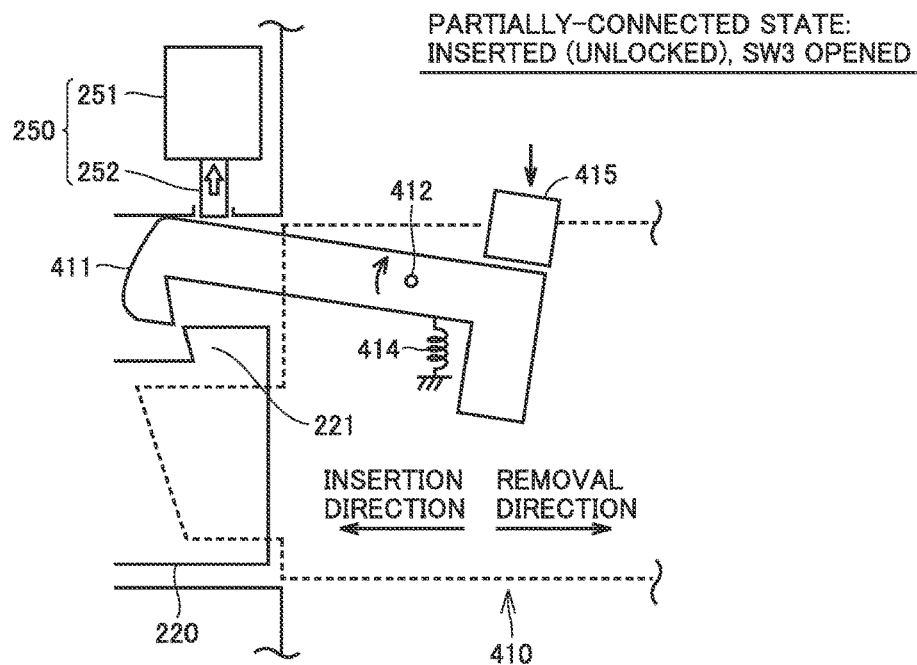
FIG. 5 is a cross-sectional view taken along line A-A in FIG. 3 and showing a case in which the connection between the connector and the inlet is in the partially-connected state.
Figure 6:
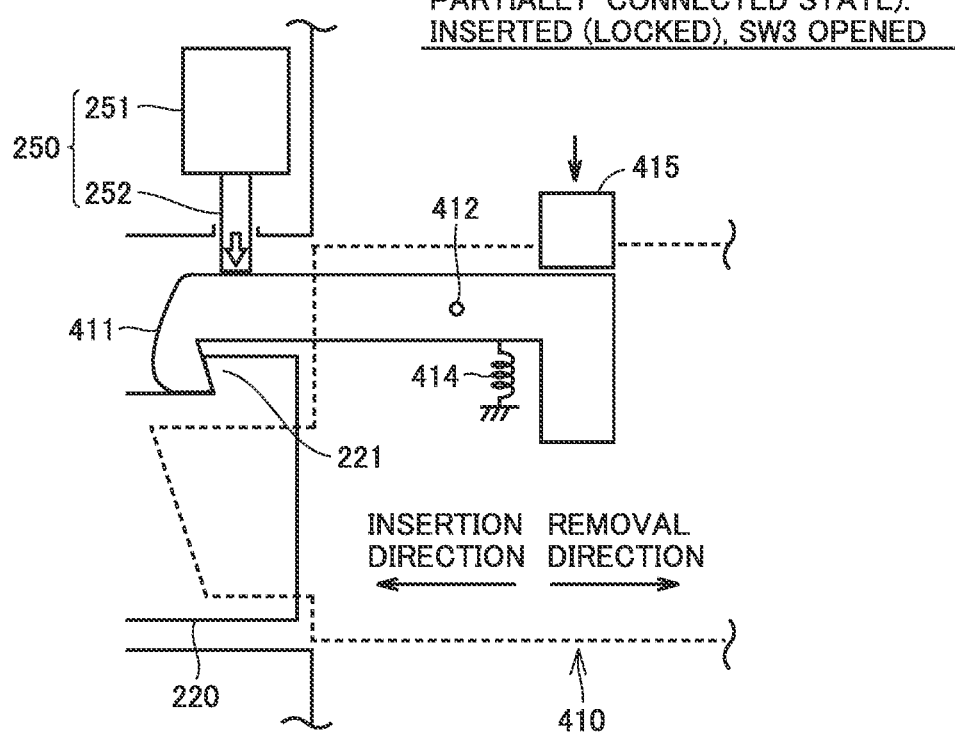
FIG. 6 is a cross-sectional view taken along line A-A in FIG. 3 and showing a case in which the connection between the connector and the inlet is falsely recognized as being in the partially-connected state.

FIG. 3 is a diagram showing a structure around inlet 220 and a structure of connector 410. FIGS. 4 to 6 are cross-sectional views taken along line A-A in FIG. 3. The state of connection between connector 410 and inlet 220 as well as the latching mechanism between connector 410 and inlet 220 by locking device 250 will be described with reference to FIGS. 3 to 6.

FIG. 4 shows the case in which the connection between connector 410 and inlet 220 is in the connection-latched state. Referring to FIG. 3 together with FIG. 4, connector 410 of charging cable 400 is provided with a link 411. Link 411 is rotatably attached to the circumference of a shaft 412. One end of link 411 is provided with a convex portion that engages with a protrusion 221 of inlet 220, and the other end thereof is provided with push button 415. Push button 415 and link 411 are configured such that link 411 operates in accordance with the operation of push button 415.

Although not shown, when push button 415 is not operated, switch SW3 (FIG. 2) is in the closed state. When push button 415 is operated, switch SW3 is opened. In this connection-latched state, push button 415 is not operated, and thus, switch SW3 is in the closed state and the potential of connector connection signal PISW is V4. Link 411 is biased by a spring 414 in a direction of pushing up push button 415.

When connector 410 is inserted into inlet 220, the convex portion provided at the tip of link 411 engages with protrusion 221 of inlet 220. As a result, connector 410 is latched with inlet 220 (latching mechanism).

Locking device 250 is provided above inlet 220. Locking device 250 is configured to switch between the locked state in which connector 410 cannot be removed from inlet 220 and the unlocked state in which connector 410 can be removed from inlet 220. Specifically, locking device 250 includes a lock bar 252 that slides in the vertical direction, and an actuator 251 that causes lock bar 252 to slide.

In this connection-latched state, locking device 250 is in the locked state. In the locked state, lock bar 252 is slid downward and fixed at a position where lock bar 252 comes into contact with the upper surface of link 411. As a result, even if push button 415 is operated, rotation of link 411 is restricted by lock bar 252, and the convex portion of link 411 is no longer detached from protrusion 221 of inlet 220. In other words, even if push button 415 is operated, connector 410 can no longer be removed from inlet 220.

FIG. 5 shows the case in which the connection between connector 410 and inlet 220 is in the partially-connected state. Referring to FIG. 5, the partially-connected state refers to a state in which, although connector 410 is arranged in inlet 220, the connection between connector 410 and inlet 220 is not latched as a result of operation of push button 415. In this partially-connected state, push button 415 is operated, and thus, switch SW3 is in the open state and the potential of connector connection signal PISW is V5 (V5>V4).

In this partially-connected state, locking device 250 is in the unlocked state. In the unlocked state, lock bar 252 is slid upward and fixed at a position where lock bar 252 does not restrict rotation of link 411. As a result, link 411 rotates along the circumference of shaft 412 and the convex portion provided at the opposite end rises when push button 415 is operated. As a result, the convex portion of link 411 is detached from protrusion 221 of inlet 220, and connector 410 can be removed from inlet 220.

FIG. 6 shows the case in which the connection between connector 410 and inlet 220 is falsely recognized as being in the partially-connected state due to connector connection signal PISW, although the connection between connector 410 and inlet 220 is physically in the connection-latched state. Referring to FIG. 6, there is more or less clearance in locking device 250 and link 411, and thus, push button 415 may somewhat move to such an extent that the movement does not greatly affect the function of locking device 250, even when locking device 250 is in the locked state. Therefore, when push button 415 is operated and switch SW3 (FIG. 2) is opened although the connection between connector 410 and inlet 220 is in the connection-latched state, connector connection signal PISW indicates the partially-connected state (potential V5) and the connection between connector 410 and inlet 220 is falsely recognized as being in the partially-connected state.

When the connection between connector 410 and inlet 220 is falsely recognized as being in the partially-connected state and external charging is stopped, various problems described below may arise. Specifically, for example, external charging may remain stopped when the user is away from vehicle 100, or in a public charging apparatus that requires authentication on a per-charging basis, the authentication operation for restarting external charging may be required again by, for example, touching an authentication card to a card reader because authentication is canceled, or the fee payment operation may be performed again in the case of a system that collects a fee on a per-charging basis.

Thus, in vehicle 100 to which the charging apparatus according to the present embodiment is applied, even if connector connection signal PISW indicates that the connection between connector 410 and inlet 220 is in the partially-connected state (potential V5), it is determined that the connection between connector 410 and inlet 220 is in the connection-latched state and the state of permitting external charging (charging permitted state) is selected (continued) (signal S2 is turned on), when locking device 250 is in the locked state. As a result, the charging permitted state can be continued even if a third party tries to remove connector 410 by mistake (or intentionally), for example. Therefore, according to the present embodiment, unnecessary stop of external charging caused by the operation of the connector can be suppressed.

On the other hand, when connector connection signal PISW indicates that the connection between connector 410 and inlet 220 is in the partially-connected state and when locking device 250 is in the unlocked state, it is determined that the connection between connector 410 and inlet 220 is physically in the partially-connected state and the state of not permitting external charging (charging non-permitted state) is selected (signal S2 is turned off).

Figure 7:
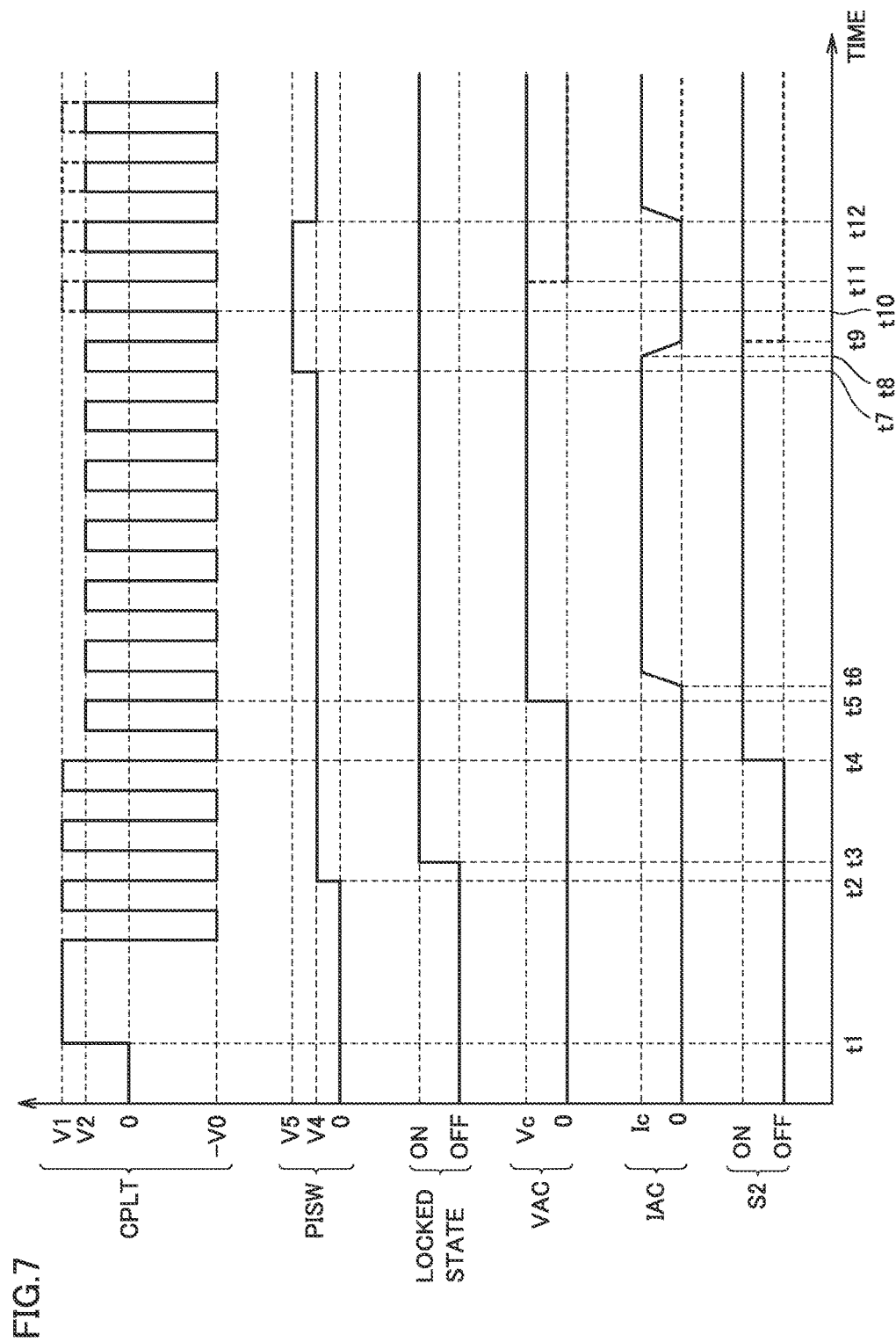

FIG. 7 is a time chart showing changes in pilot signal CPLT, connector connection signal PISW, signal S2 and the like. In this FIG. 7, changes in the conventional art are shown by the dotted lines as a reference example. In FIG. 7, the horizontal axis represents the time, and the vertical axis represents pilot signal CPLT, connector connection signal PISW, the locked state of locking device 250, a charging voltage VAC and a charging current IAC input to charger 200, and signal S2 indicative of whether vehicle 100 is in the charging permitted state or in the charging non-permitted state.

Referring to FIG. 2 together with FIG. 7, when connector 410 is inserted into inlet 220 at time t1, the potential of pilot signal CPLT is raised to V1 by resistance circuit 320 of ECU 300. When this potential V1 is sensed by CPLT control circuit 470 of charging cable 400, pilot signal CPLT oscillates. At this time, signal S2 is OFF and switch SW2 of resistance circuit 320 is OFF, and thus, the potential of pilot signal CPLT is raised to V1.

When the input and oscillation of pilot signal CPLT are sensed and CPU 310 recognizes that connector 410 has been inserted into inlet 220, the voltage is supplied to power source node 350 of ECU 300 and the potential of connector connection signal PISW is raised to V4 at time t2 (at this time, push button 415 is not operated). Thereafter, at time t3, a locking instruction is output from CPU 310 to actuator 251 of locking device 250, and locking device 250 enters the locked state.

Then, when the predetermined preparation process for executing external charging is completed in vehicle 100, CPU 310 switches signal S2 from OFF to ON at time t4. As a result, switch SW2 of resistance circuit 320 is turned on and the potential of pilot signal CPLT is raised to V2 (V2<V1). In response, at time t5, CCID relay 450 of charging cable 400 is controlled to be in the closed state and a charging voltage Vc is applied from charging cable 400 to charger 200. Thereafter, at time t6, external charging is started and a charging current Ic is supplied from charging cable 400 to charger 200.

Let us suppose that at time t7, a third party operates push button 415 of connector 410 by mistake (or intentionally) during external charging, for example, and switch SW3 (FIG. 2) is thereby opened. When switch SW3 is opened, the potential of connector connection signal PISW is raised to V5 (V5>V4).

In the case of the reference example (conventional art), when the potential of connector connection signal PISW is raised to V5, it is determined that the connection between connector 410 and inlet 220 has entered the partially-connected state, and the charger is stopped and charging current IAC is set at zero, and thereafter, signal S2 is turned off at time t9 (dotted line). Then, at time t10, the potential of pilot signal CPLT is raised to V1, and at time t11, CCID relay 450 is opened and charging voltage VAC thereby becomes zero (external charging is stopped). As described above, in the case of the reference example (conventional art), when a third party operates push button 415 of connector 410 by mistake (or intentionally), for example, and switch SW3 is thereby opened, signal S2 is turned off, the charging non-permitted state is obtained and external charging is stopped, even if locking device 250 is in the locked state. Once external charging is stopped, the user operation for restarting charging (such as, for example, the authentication operation for restarting external charging by, for example, touching an authentication card to a card reader again in a public charging apparatus because authentication is canceled) is required, which is troublesome for the user.

In contrast, in the present embodiment, since locking device 250 is in the locked state even though the potential of connector connection signal PISW is raised to V5 at time t7, it is determined that the connection between connector 410 and inlet 220 is in the connection-latched state, and signal S2 is maintained in the ON state. Therefore, the potential of pilot signal CPLT is also maintained at V2 and CCID relay 450 is also maintained in the closed state. That is to say, the charging permitted state is maintained. As a result, external charging can be restarted without performing the user operation for restarting external charging (such as the above-described authentication operation).

In the present embodiment, when the potential of connector connection signal PISW is raised to V5 at time t7, charger 200 is controlled to reduce charging current IAC at time t8. As a result, even if the locking is released due to a failure of locking device 250 and the like and connector 410 is removed from inlet 220, removal of connector 410 from inlet 220 with a large current flowing can be avoided (hot disconnect is prevented). Although charging current IAC is reduced to zero in this example, charging current IAC does not necessarily need to be reduced to zero.

Then, when push button 415 of connector 410 is released at time t12, the reduction of charging current IAC is canceled and external charging is restarted. That is to say, in the present embodiment, although charging current IAC is reduced to prevent hot disconnect, the charging permitted state is maintained, and thus, when push button 415 is released, external charging is restarted without performing the user operation for restarting external charging.

Figure 8:
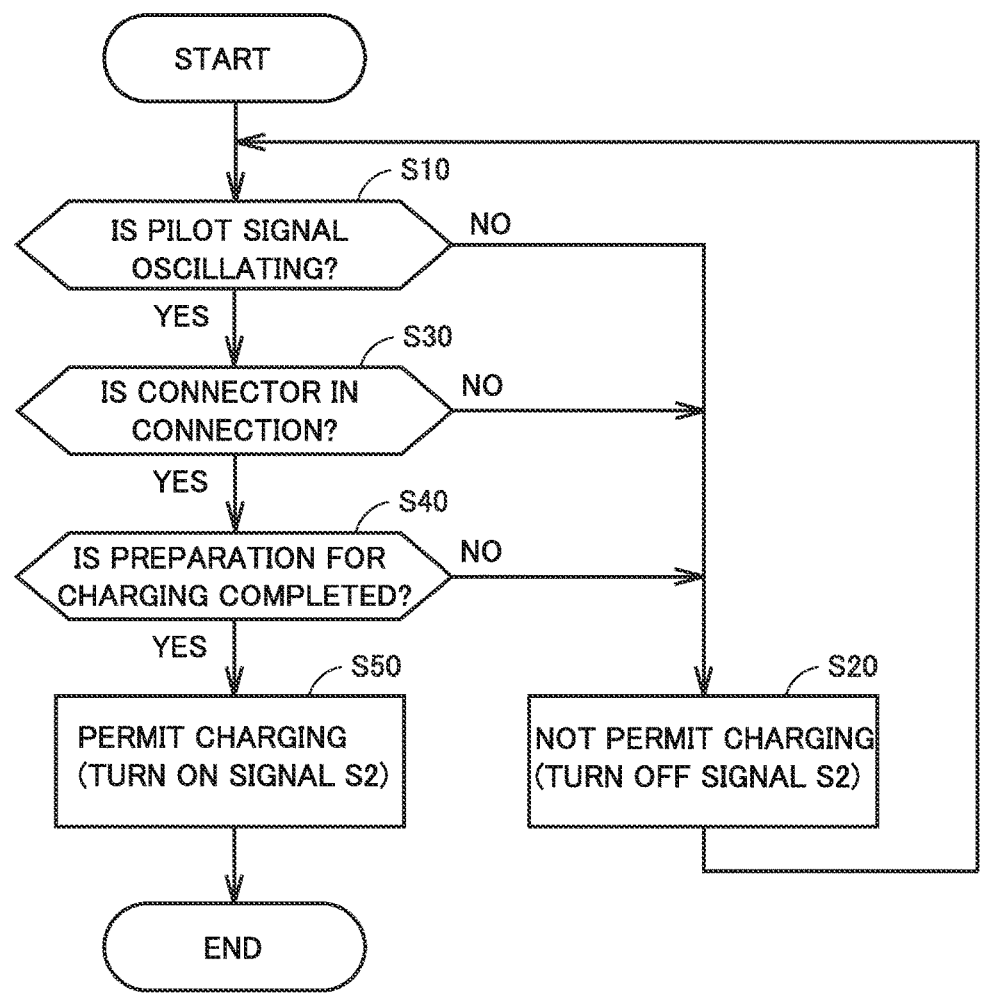
FIG. 8 is a flowchart illustrating a procedure of an external charging start determination process executed by a CPU of the ECU.

FIG. 8 is a flowchart illustrating a procedure of an external charging start determination process executed by CPU 310 of ECU 300. The process shown in this flowchart is started, for example, when CPU 310 senses the start of input of pilot signal CPLT.

Referring to FIG. 8, when the start of input of pilot signal CPLT is sensed, CPU 310 determines whether or not pilot signal CPLT is oscillating (step S10). If pilot signal CPLT is not oscillating (NO in step S10), CPU 310 turns off signal S2 and does not permit external charging (charging non-permitted state) (step S20). Thereafter, CPU 310 returns the process to step S10.

If the oscillation of pilot signal CPLT is sensed in step S10 (YES in step S10), CPU 310 determines whether or not connector 410 is in connection to inlet 220 (step S30). Here, it is determined whether or not the connection between connector 410 and inlet 220 is in the connection-latched state, and the partially-connected state is determined as a state in which connector 410 is not in connection to inlet 220. Based on the potential of connector connection signal PISW, it is determined whether or not connector 410 is in connection to inlet 220. If it is determined in step S30 that connector 410 is not in connection to inlet 220 (NO in step S30), CPU 310 moves the process to step S20 and does not permit external charging (turns off signal S2).

If it is determined in step S30 that connector 410 is in connection to inlet 220 (YES in step S30), CPU 310 determines whether or not the predetermined preparation process for executing external charging is completed in vehicle 100 (step S40). If it is determined in step S40 that the preparation process is not completed (NO in step S40), CPU 310 moves the process to step S20 and does not permit external charging (turns off signal S2).

On the other hand, if it is determined in step S40 that the preparation process for external charging is completed (YES in step S40), CPU 310 turns on signal S2 and permits external charging (step S50). As a result, external charging is started.

Figure 9:
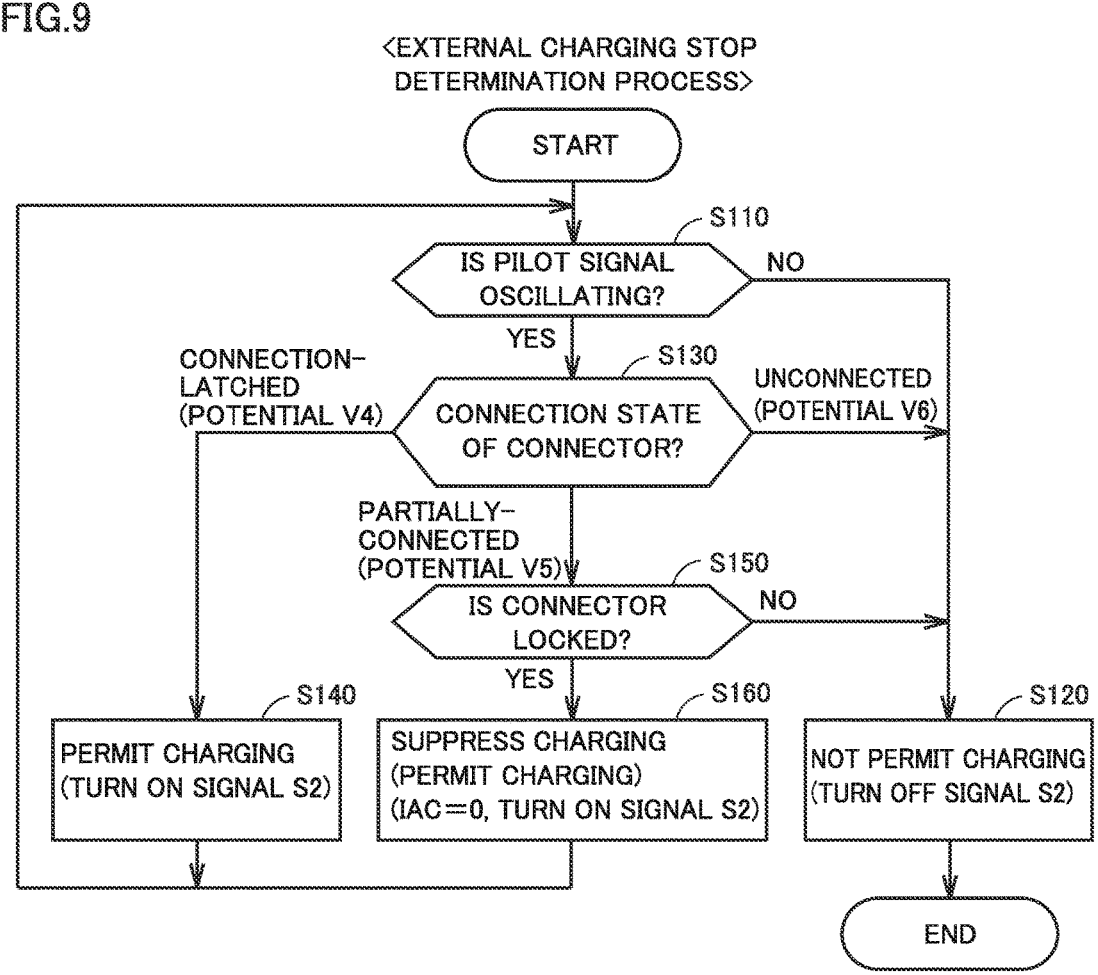
FIG. 9 is a flowchart illustrating a procedure of an external charging stop determination process executed by the CPU of the ECU.

FIG. 9 is a flowchart illustrating a procedure of an external charging stop determination process executed by CPU 310 of ECU 300. The process shown in this flowchart is started when signal S2 is turned on as a result of the external charging start determination process shown in FIG. 8.

Referring to FIG. 9, when signal S2 is turned on, CPU 310 determines whether or not pilot signal CPLT is oscillating (step S110). If pilot signal CPLT is not oscillating (NO in step S110), CPU 310 turns off signal S2 and does not permit external charging (charging non-permitted state) (step S120). Thereafter, CPU 310 moves the process to END.

If the oscillation of pilot signal CPLT is sensed in step S110 (YES in step S110), CPU 310 determines the state of connection between connector 410 and inlet 220 (step S130). The state of connection between connector 410 and inlet 220 is determined based on the potential of connector connection signal PISW.

If it is determined that the potential of connector connection signal PISW is V4 and the connection between connector 410 and inlet 220 is in the connection-latched state ("connection-latched" in step S130), CPU 310 turns on signal S2 and permits external charging (step S140). That is to say, signal S2 is maintained in the ON state and the charging permitted state is continued. If it is determined in step S130 that the potential of connector connection signal PISW is V6 and connector 410 and inlet 220 are not connected to each other ("unconnected" in step S130), CPU 310 moves the process to step S120 and does not permit external charging (turns off signal S2).

If it is determined in step S130 that the potential of connector connection signal PISW is V5 and the connection between connector 410 and inlet 220 is in the partially-connected state ("partially-connected" in step S130), CPU 310 determines whether or not locking device 250 is in the locked state (step S150). If it is determined that locking device 250 is in the locked state (YES in step S150), CPU 310 continues the charging permitted state and reduces the charging current to suppress charging (step S160). That is to say, although charging current IAC is reduced (e.g., zero), signal S2 is maintained in the ON state and the charging permitted state is continued. For example, in a public charging apparatus that requires authentication on a per-charging basis, the authentication operation for restarting external charging is required by, for example, touching an authentication card to a card reader, because authentication is canceled when external charging is stopped. However, the need to perform such authentication operation again is eliminated.

If it is determined in step S150 that locking device 250 is not in the locked state (in the unlocked state) (NO in step S150), CPU 310 moves the process to step S120 and does not permit external charging (turns off signal S2). That is to say, external charging is stopped. In this case, as described above, the authentication operation for restarting external charging is required, for example, in a public charging apparatus that requires authentication on a per-charging basis.

As described above, in the present embodiment, even if it is determined based on connector connection signal PISW that the connection between connector 410 and inlet 220 is in the partially-connected state, it is determined that the connection between connector 410 and inlet 220 is physically in the connection-latched state, and external charging is permitted, when locking device 250 is in the locked state. As a result, even if a third party tries to remove connector 410 by mistake (or intentionally), for example, the charging permitted state is continued. Therefore, according to the present embodiment, unnecessary stop of external charging caused by the operation of the connector can be suppressed.

In addition, in the present embodiment, when it is determined that the connection between connector 410 and inlet 220 is in the partially-connected state and when locking device 250 is in the locked state, the charging permitted state is continued and charging current IAC is reduced. As a result, even if connector 410 is removed from inlet 220, removal of connector 410 from inlet 220 with a large current flowing can be prevented.

In addition, in the present embodiment, when push button 415 of connector 410 is released while charging current IAC is being reduced, the connection state indicated by connector connection signal PISW recovers from the partially-connected state to the connection-latched state (the potential of connector connection signal PISW recovers from V5 to V4) and the reduction of charging current IAC ends (step S140). Therefore, external charging can be restarted without performing the authentication operation and the like for restarting external charging (ending the reduction of the current).

In the present embodiment, when it is determined that the potential of connector connection signal PISW is V5 and the connection between connector 410 and inlet 220 is in the partially-connected state, it is determined whether or not locking device 250 is in the locked state (step S150). However, the processing in step S150 may be omitted. Specifically, when it is determined in step S130 that the connection between connector 410 and inlet 220 is in the partially-connected state, the process may be moved to step S160 and the charging permitted state may be continued. As a result, as long as input of pilot signal CPLT can be sensed (YES in step S110), i.e., as long as connector 410 is in connection to inlet 220, the state of permitting external charging is continued even if push button 415 of connector 410 is operated by mistake and connector connection signal PISW indicates the partially-connected state. Therefore, unnecessary stop of external charging caused by the operation of the connector can be suppressed.

First Modification

The actuation power for ECU 300, charger 200 and the like is supplied from a power storage device for auxiliary machinery. In vehicle 100 of the present disclosure, during external charging, a part of the electric power supplied from external power source 510 is supplied to the power storage device for auxiliary machinery and the power storage device for auxiliary machinery is thereby charged with the electric power. Therefore, if the reduced state of charging current IAC continues for a long time when it is determined that the connection between connector 410 and inlet 220 is in the partially-connected state and when locking device 250 is in the locked state, the power storage device for auxiliary machinery may be exhausted.

Thus, in this first modification, when the situation in which it is determined that the connection between connector 410 and inlet 220 is in the partially-connected state and locking device 250 is in the locked state continues for a predetermined time period, signal S2 is turned off and external charging is stopped. When external charging is stopped, consumption of the auxiliary power by ECU 300, charger 200 and the like is suppressed, and thus, exhaustion of the power storage device for auxiliary machinery can be avoided.

Figure 10:
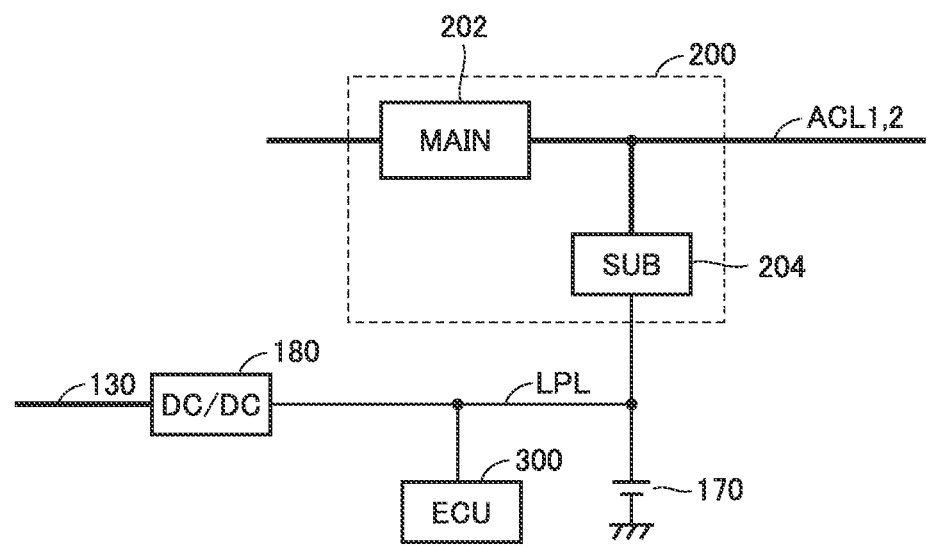
FIG. 10 is a circuit diagram of an auxiliary electric power system of the vehicle.

FIG. 10 is a circuit diagram of an auxiliary power system of vehicle 100. Referring to FIG. 10, in addition to the devices shown in FIG. 1, vehicle 100 further includes a power storage device for auxiliary machinery 170, a DC/DC converter 180 and a low-voltage power line LPL.

Power storage device for auxiliary machinery 170 is a rechargeable DC power source and is configured to include a secondary battery such as, for example, a lead storage battery and a nickel-metal hydride battery. The actuation power for ECU 300, charger 200 and the other auxiliary machinery is stored in power storage device for auxiliary machinery 170. A capacitor and the like can also be used as power storage device for auxiliary machinery 170.

Charger 200 includes a main converter 202 and a sub converter 204. During external charging, main converter 202 converts the electric power supplied from external power source 510 (FIG. 1) to charger 200 to DC electric power having the charging voltage of power storage device 110 (FIG. 1), and outputs the DC electric power to power storage device 110. During external charging, sub converter 204 converts a part of the electric power supplied from external power source 510 to charger 200 to DC electric power having an auxiliary voltage, and outputs the DC electric power to power storage device for auxiliary machinery 170. The capacity of sub converter 204 is smaller than the capacity of main converter 202.

DC/DC converter 180 is connected to power line pair 130 (FIG. 1) disposed between SMR 120 and PCU 140. DC/DC converter 180 steps down the electric power supplied from power line pair 130 at the time of actuation of the high-voltage system including PCU 140 and motive power output device 150 (FIG. 1), and outputs the electric power to low-voltage power line LPL.

During external charging, the high-voltage system including PCU 140 and motive power output device 150 is in the stop state and SMR 120 is also OFF, and thus, DC/DC converter 180 is not actuated. During external charging, sub converter 204 is actuated, and a part of the electric power supplied from external power source 510 is supplied to power storage device for auxiliary machinery 170 and power storage device for auxiliary machinery 170 is thereby charged with the electric power.

Figure 11:
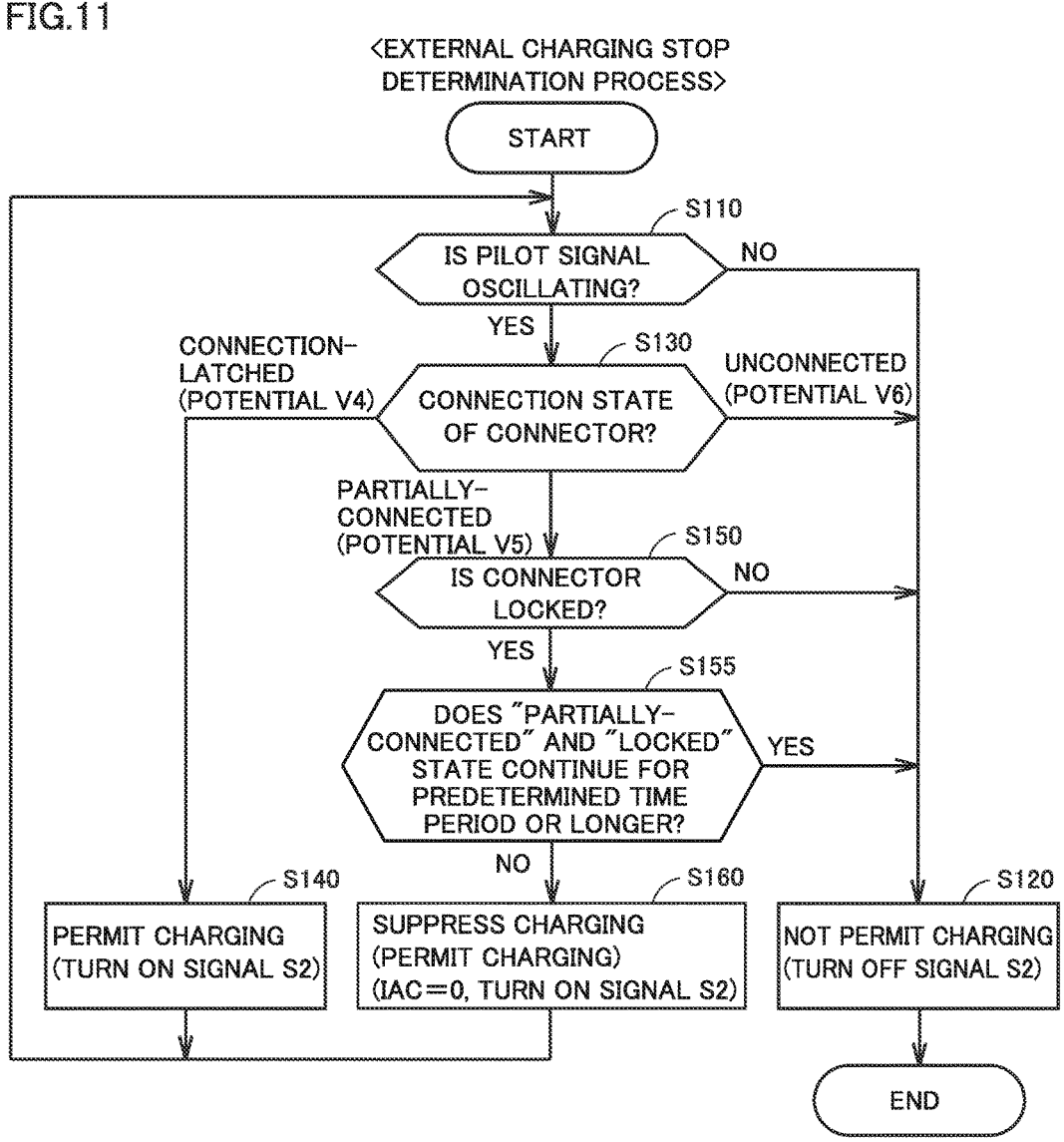
FIG. 11 is a flowchart illustrating a procedure of an external charging stop determination process executed by a CPU of an ECU in a first modification.

FIG. 11 is a flowchart illustrating a procedure of an external charging stop determination process executed by CPU 310 of ECU 300 in this first modification. This flowchart corresponds to that of FIG. 9 described in the foregoing embodiment. The process shown in this flowchart is also started when signal S2 is turned on as a result of the external charging start determination process shown in FIG. 8.

Referring to FIG. 11, this flowchart further includes step S155 in the flowchart described with reference to FIG. 9. Specifically, if it is determined in step S150 that locking device 250 is in the locked state (YES in step S150), CPU 310 determines whether or not the situation in which it is determined that the connection between connector 410 and inlet 220 is in the partially-connected state and locking device 250 is in the locked state continues for the predetermined time period (step S155). The predetermined time period is set as appropriate, in accordance with the capacity of power storage device for auxiliary machinery 170 and the like.

If it is determined that the above-described situation continues for the predetermined time period (YES in step S155), CPU 310 moves the process to step S120 and does not permit external charging (turns off signal S2). On the other hand, if it is determined in step S155 that the above-described situation does not continue for the predetermined time period (NO in step S155), CPU 310 moves the process to step S160, and continues the charging permitted state and reduces the charging current to suppress charging. That is to say, although charging current IAC is reduced (e.g., zero), signal S2 is maintained in the ON state and the charging permitted state is continued.

In this first modification as well, the effect similar to that of the above-described embodiment is obtained. Furthermore, in this first modification, when the situation in which it is determined that the connection between connector 410 and inlet 220 is in the partially-connected state and locking device 250 is in the locked state continues for the predetermined time period, external charging is not permitted (external charging is stopped). As a result, consumption of the auxiliary power by ECU 300, charger 200 and the like is suppressed, and thus, exhaustion of power storage device for auxiliary machinery 170 caused by the reduction of charging current IAC can be avoided.

Second Modification

In the embodiment and the first modification described above, when it is determined that the connection between connector 410 and inlet 220 is in the partially-connected state and when locking device 250 is in the locked state, the charging current is reduced to suppress charging (prevent hot disconnect). However, believing that locking device 250 is in the locked state, charging (charging permitted state) may be continued without reducing the charging current.

Figure 12:
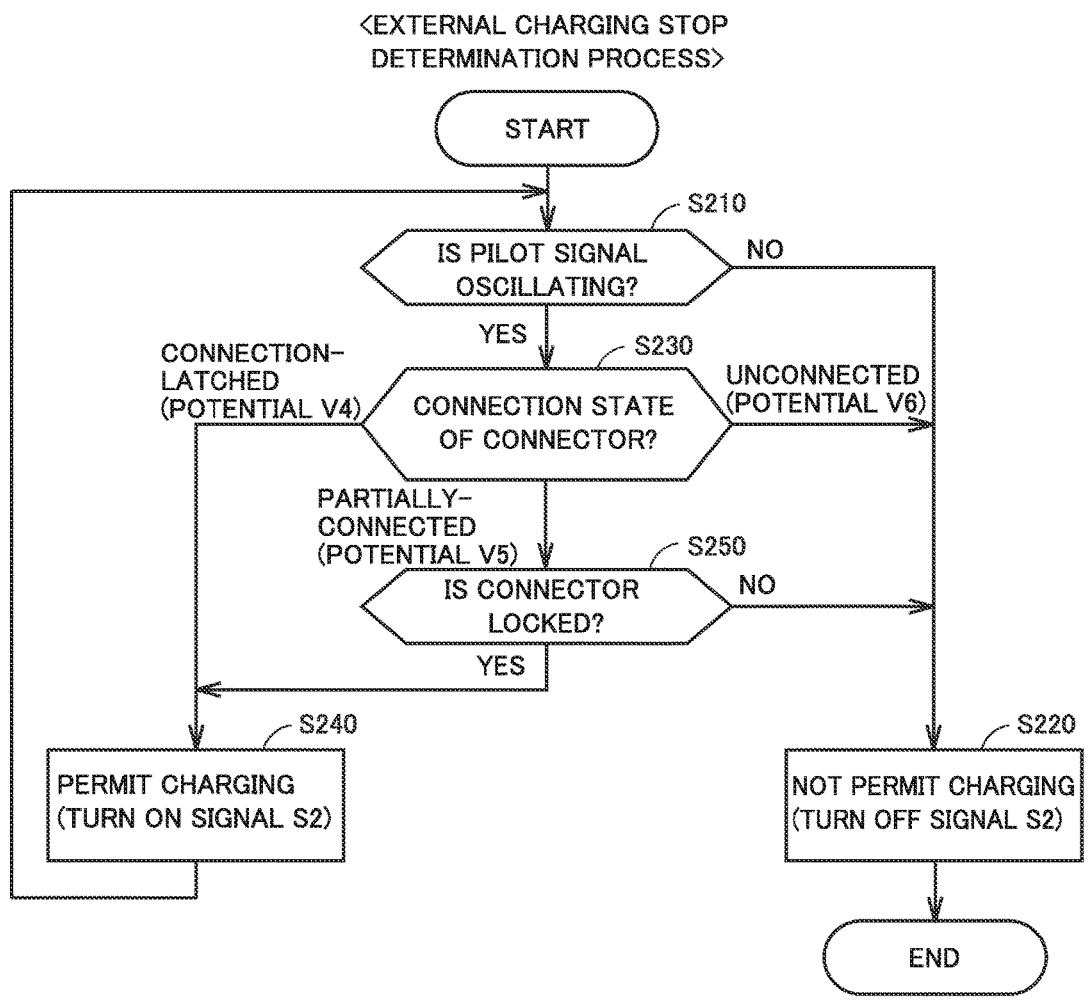
FIG. 12 is a flowchart illustrating a procedure of an external charging stop determination process executed by a CPU of an ECU in a second modification.

FIG. 12 is a flowchart illustrating a procedure of an external charging stop determination process executed by CPU 310 of ECU 300 in this second modification. This flowchart also corresponds to that of FIG. 9 described in the foregoing embodiment. The process shown in this flowchart is also started when signal S2 is turned on as a result of the external charging start determination process shown in FIG. 8.

Referring to FIG. 12, this flowchart includes steps S210 to S250. The processings executed in steps S210 to S250 are the same as the processings executed in steps S110 to S150 shown in FIG. 9, respectively. However, this flowchart is different from the flowchart shown in FIG. 9 in terms of destination of the process when it is determined in step S250 that locking device 250 is in the locked state.

Specifically, if it is determined in step S250 that locking device 250 is in the locked state (YES in step S250), CPU 310 moves the process to step S240 and permits external charging (turns on signal S2). That is to say, signal S2 is maintained in the ON state and external charging (charging permitted state) is continued. As described above, in this second modification, when it is determined that the connection between connector 410 and inlet 220 is in the partially-connected state and when locking device 250 is in the locked state, external charging is continued without reducing the charging current.

As described above, according to this second modification as well, unnecessary stop of external charging can be suppressed.

In this second modification as well, when it is determined that the potential of connector connection signal PISW is V5 and the connection between connector 410 and inlet 220 is in the partially-connected state, it is determined whether or not locking device 250 is in the locked state (step S250). However, the processing in step S250 may be omitted. Specifically, when it is determined in step S230 that the connection between connector 410 and inlet 220 is in the partially-connected state, the process may be moved to step S240 and the charging permitted state may be continued. As a result, as long as input of pilot signal CPLT can be sensed (YES in step S210), i.e., as long as connector 410 is in connection to inlet 220, the state of permitting external charging is continued even if push button 415 of connector 410 is operated by mistake and connector connection signal PISW indicates the partially-connected state. Therefore, unnecessary stop of external charging caused by the operation of the connector can be suppressed.

Although the embodiment of the present disclosure has been described, it should be understood that the embodiment disclosed herein is illustrative and not limitative in any respect. The scope of the present disclosure is defined by the terms of the claims and is intended to include any modifications within the scope and meaning equivalent to the terms of the claims.

What is claimed is:

1. A charging apparatus for charging a vehicle-mounted power storage device with electric power supplied from an electric power source external to a vehicle through a charging cable, the charging apparatus comprising:
   an inlet configured to connect with a connector of the charging cable; and
   a control device configured to:
   switch between (i) a first state in which charging of the power storage device is permitted and (ii) a second state in which charging of the power storage device is not permitted; and
   receive a connection signal indicating whether or not a state of connection between the connector and the inlet is a partially-connected state in which the connection between the connector and the inlet is not latched, wherein
   when the connector is in connection to the inlet, the control device is configured to select the first state even if the connection signal indicates that the state of connection between the connector and the inlet is the partially-connected state.

2. The charging apparatus according to claim 1, further comprising
   a locking device configured to switch between (i) a locked state in which the connector connected to the inlet cannot be removed from the inlet and (ii) an unlocked state in which the connector connected to the inlet can be removed from the inlet, wherein
   when the connection signal indicates the partially-connected state and when the locking device is in the locked state, the control device is configured to select the first state, and
   when the connection signal indicates the partially-connected state and when the locking device is in the unlocked state, the control device is configured to select the second state even if the connector is in connection to the inlet.

3. The charging apparatus according to claim 2, wherein when the connection signal indicates the partially-connected state and when the locking device is in the locked state, the control device is configured to select the first state and reduce a current received from the electric power source through the charging cable.

4. The charging apparatus according to claim 3, wherein when the connection signal indicates a state in which the connection between the connector and the inlet is latched, while the control device is reducing the current, then the control device is configured to end the reduction of the current.

5. The charging apparatus according to claim 3, wherein during the first state, the charging apparatus is actuated with electric power supplied from a power storage device for auxiliary machinery, the power storage device for auxiliary machinery being charged with a part of the electric power supplied from the electric power source through the charging cable, and
   when a situation in which the connection signal indicates the partially-connected state and the locking device is in the locked state continues for a predetermined time period, the control device is configured to switch from the first state to the second state.

6. A control method for a charging apparatus for charging a vehicle-mounted power storage device with electric power supplied from an electric power source external to a vehicle through a charging cable,
   the charging apparatus comprising:
   an inlet configured to connect with a connector of the charging cable; and
   a locking device configured to switch between (i) a locked state in which the connector connected to the inlet cannot be removed from the inlet and (ii) an unlocked state in which the connector connected to the inlet can be removed from the inlet,
   the control method comprising:
   determining whether a state of connection between the connector and the inlet is in a partially-connected state based on a connection signal indicative of the state of connection between the connector and the inlet;
   determining whether the locking device is in the locked state or in the unlocked state;
   not permitting charging of the power storage device when it is determined that the state of connection is in the partially-connected state and when it is determined that the locking device is in the unlocked state, the partially-connected state being a state in which the connection between the connector and the inlet is not latched; and
   permitting charging of the power storage device when it is determined that the state of connection is in the partially-connected state and when it is determined that the locking device is in the locked state.

* * * * *

UNITED STATES PATENT AND TRADEMARK OFFICE
CERTIFICATE OF CORRECTION

PATENT NO. : 10,328,809 B2
APPLICATION NO. : 15/687809
DATED : June 25, 2019
INVENTOR(S) : Tomokazu Masuda Page 1 of 1

It is certified that error appears in the above-identified patent and that said Letters Patent is hereby corrected as shown below:

In the Specification

In Column 3, Line 63, before "connection", delete "film" and insert --firm--, therefor.

Signed and Sealed this
Twentieth Day of August, 2019

Andrei Iancu
*Director of the United States Patent and Trademark Office*